INVENTORS
JOHN A. BAUMANN
ALFRED R. TAVAROZZI

BY Louis J. Bachand Jr.
ATTORNEY

United States Patent Office 3,376,629
Patented Apr. 9, 1968

3,376,629
METHOD AND MEANS FOR SUPPORT OF CEMENTITIOUS MATERIALS ON SLOPING SURFACES DURING CURE
John A. Baumann, Dunellen, and Alfred R. Tavarozzi, Somerville, N.J., assignors to Union Carbide Corporation, a corporation of New York
Filed Oct. 14, 1963, Ser. No. 316,055
3 Claims. (Cl. 52—309)

ABSTRACT OF THE DISCLOSURE

A moisture resistant web attached to plastic underlayment for water conveying channels constructed from aggregate containing cement traps the aggregate applied to the sloping walls of such channels during construction thereby providing an anchor for the cement during cure.

---

This invention relates to the support of cementitious materials during cure. More particularly, the invention relates to method and means for supporting cementitious materials during cure.

The value of cementitious materials as surface covering is well recognized. Permanence, beauty and low cost make cementitious materials such as concrete the material of choice for many structural applications. One such application is in water conveying. Pipes of concrete form a subterranean latticework in most of our cities. Over the centuries, growth of cities and increases in population density have made the problem of water supply ever more critical. The widespread use of irrigation in the western United States has further burdened water supply systems. Fabrication of pipe for larger tasks such as the water supply of major concentrations of population is prohibitively expensive. So, in these modern times engineers turn to an ancient artifact of Babylon and Rome, the aqueduct. In these times, the ancient stone-upon-a-stone construction of aqueducts is insufficient to the need. Cementitious materials are thus employed. The leakage of water through the porous material is, however, an impermissible drain upon this ultimate resource. Fortunately, modern science has met this modern need. The discovery of water impermeable, flexible coverings such as thermoplastics, e.g., films of polyvinyl chloride and polyethylene, provides the means of retaining much of the water which would, prior to their discovery, have been lost.

The use of plastic underlayment for cementitious materials while solving the problem of water loss by seepage through cementitious material creates some problems, too. Classically and presently, aqueducts and similar water channeling structures have sloping sides. The use of plastic underlayment, however, on sloping surfaces removes the rough anchoring surface generally provided by the earth. As a consequence, cementitious materials poured on sloping, plastic underlaid surfaces tend to slide and break apart. This is particularly true of high slump value cementitious materials, i.e., those having slumps in excess of 1.5 inches when tested in the standard manner (identified below). The high slump materials are less viscous and hence easier pouring and smoothing than low slump materials, but the impracticality of using the high slump materials on plastic underlayment has necessitated an abandoning of the use of plastic underlayment with consequent seepage problems in the final structure, or the use of low slump value cementitious materials with their lower application rates and consequent higher installation costs.

It is therefore an object of the present invention to provide method and means for supporting cementitious materials during cure.

It is another object to provide method and means for supporting wet cementitious materials upon plastic underlayment even when disposed on sloping surfaces.

These and other objects are achieved in accordance with the present invention by maintaining within cementitious material disposed on a plastic underlayment a moisture-resistant, flexible web fastened at various portions to the plastic underlayment which has a plurality of aggregate-engaging fenestrations.

Means for supporting cementitious material are provided comprising plastic underlayment and a moisture-resistant, flexible web having a plurality of fenestrations fastened together in a manner permitting variation in the spacing of the underlayment and portions of the web.

Figure 1:
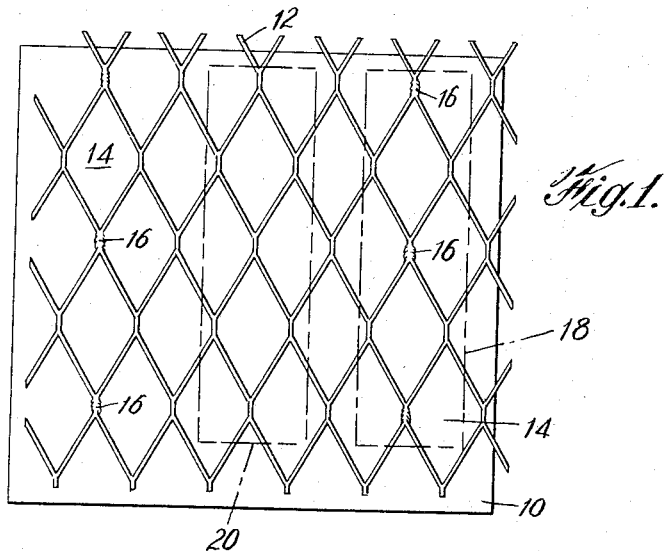
FIG. 1 is a plan view of one embodiment of cementitious material support means of the invention.
Figure 2:
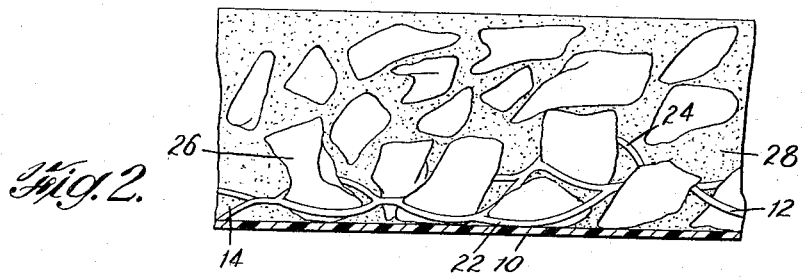
FIG. 2 is an elevational view in section of an application of the means of FIG. 1.

Referring now to the drawings in detail, there is shown in FIG. 1 a generally planar plastic underlayment 10 having superimposed thereon a web 12 having a plurality of fenestrations 14. Web 12 is fastened to plastic underlayment 10 at a plurality of points 16 such that portions of web 12 such as those in the areas defined by broken line 18 are generally stationary and other portions such as those in the area defined by broken line 20 are mobile and capable of substantial variation in spacing from the underlayment 10. The extent of variation possible is indicated by a comparison of points 22 and 24 in FIG. 2.

At each point of fastening 16 the web 12 is held substantially immobile against the plastic underlayment 10. Portions of web 12 between successive fastening points 16 are free to move with respect to the plastic underlayment 10. The means of securing the web 12 to plastic underlayment 10 is not narrowly critical and may desirably be varied with the materials of construction. Thus staples, loops, ties and toggle clamps are useful as well as solvent, adhesive and heat sealing to fasten web 12 to plastic underlayment 10.

The web 12 as stated is flexible and moisture resistant. The former property permits bending of the web from the surface of the underlayment 10 and the latter property permits use in contact with wet cementitious materials. The web 12 need not be completely water-proof, rather what is needed is sufficient strength although wet to retain the aggregate, shown at 26, for a time, at least until the cementitious material sets. Thus cellulosic and fibrous materials such as twisted cellophane, jute, hemp and vines and other similar materials might be used to fabricate a suitable fenestrated web. Preferred, however, are synthetic organic thermoplastic materials. Among these may be mentioned synthetic fiber forming materials, such as polyamides, polyacrylonitriles, polyesters and the like, as well as polymers of alpha-olefins, such as propylene. The fenestrated web can be constructed by assembly of these materials as fibers. Alternatively, fenestration can be provided in nonfibrous structures as by burning, cutting, punching, stretching or otherwise creating apertures in plastic material such as sheets of plastic film. Metals, either as apertured sheet or wire netting or glass can also be used.

A particularly preferred form of web 12 is a reticulate form. A most advantageous method of preparing a reticulate web 12 of plastic netting is by extrusion of a multiplicity of strands from an extruder through a pair of counter-rotating dies to form intersections as taught for example in U.S.P. 3,019,147 to G. S. Nalle.

The size of the fenestrations is not narrowly critical. The fenestrations are required to engage the aggregate present in the cementitious material and therefore should be of a size sufficient for this.

Figure 3:
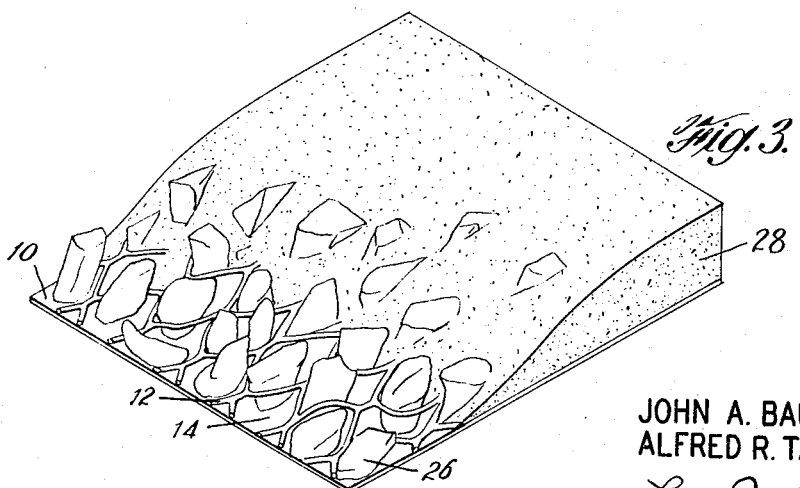
FIG. 3 is a perspective view of an application of the means of FIG. 1.

Referring to FIG. 3, the operation of the retaining means of this invention is illustrated. As the cementitious material 28 is poured over the retaining means, the aggregate components 26, shown here enlarged for illustrative purposes, find their way into the fenestrations 14 of the reticulate web 12 shown. These stones engage the web and tend to lift the mobile portions of the web 12 from the plastic underlayment 10. The lifting force is substantially spent as the stones 26 are fully engaged with the web 12. The result is a plurality of stones held in a plurality of fenestrations. The binder component of the cementitious material flows slightly over and around the aggregate but the mass of cementitious material is effectively prevented from moving over the plastic underlayment 10 as soon as substantial engagement of web 12 and aggregate 26 is achieved.

In the following example, polyethylene netting having fenestrations approximately one and one-half inches across was heat sealed to a 5 mil polyethylene plastic underlayment. The seals were made in parallel horizontal rows about at every 6 or 8 intersections vertically apart.

*Example*

A mold was constructed which could be filled with concrete on various films, and which could then be lifted at one end to provide different slopes. A space was left at the lower end of the mold for the concrete to slide. Concrete was poured to a divider to form a concrete mass 72 in. by 22 in. by 3⅝ in.

A 1–2–3 concrete mix was used with the aggregate consisting of ½ in. crushed blue stone. Except for one, all mixes were adjusted to a slump of 1½ in. (this was measured by ASTM C-143-2).

Concrete was dumped into the mold and tamped and smoothed with a wood trowel. The concrete was allowed to lie quiet for 3 minutes to permit loss of its thixotropic instability. The divider was then removed from the mold to permit the mass to slide.

The mold was then raised to a slope of 0.8/1 and held for 7½ min. If the concrete had still not slid down the slope, the mold was raised to a slope of 1.6 to 1. The polyethylene-netting composite maintained the concrete intact even at slopes of 1.6/1, i.e., the tangent of the angle of the mold with the ground was 1.6/1 (vertical distance over horizontal distance).

By the term "cementitious materials" is meant those materials generally termed cement or Portland cement. Cement comprises a major proportion of lime (CaO), and minor amounts of silica ($SiO_2$), aluminum oxide ($Al_2O_3$), iron, magnesium, potassium, sodium, titanium, and manganese; and concrete which is a mixture of cement (1 part), sand (2 parts) and gravel (4 parts) and for each 100 pounds of cement, six gallons of water. The term includes hydraulic cement, quick setting cements which generally include synthetic organic resins such as alkyds or epoxies and plasticizers and other variants of common cement.

Of course, other than cementitious materials can also be retained in place by the means of the present invention, e.g., earth, particularly containing peat and other clotted materials.

What is claimed is:
1. A method for preparing cementitious structures having sloping plastic underlaid surfaces from a cementitious mix containing stone-like aggregates which comprises:
   (a) applying and securing to a substantially continuous support having sloping supporting surface a plastic film underlayment having a thickness of about 5.0 mils and having disposed on the cement receiving surface thereof a plastic netting having stationary portions fastened to said plastic film underlayment and mobile portions capable of substantial variation in spacing from the plastic film underlayment between said stationary portions, said plastic netting having a plurality of closely spaced fenestrations of a size adapted to engage and anchor 0.5 inch crushed stone,
   (b) applying to at least the sloping portions of plastic film underlayment a cementitious mix containing stone-like aggregates in a manner which allows a plurality of the stone-like aggregates to engage and hold in a plurality of fenestrations causing a portion of the mobile portion of the plastic netting to lift away from the continuously supported plastic film underlayment thereby retarding flow of mix down the sloping surfaces,
   (c) curing the cementitious mix while the stone-like aggregates are engaged and held in the fenestrations of plastic netting.
2. An underlayment for pourable cementitious mixes containing stone-like aggregates applied to sloping supporting surfaces which comprises:
   (a) a plastic film underlayment having a thickness of about 5.0 mils adapted to be applied and secured to a sloping essentially continuous support surface,
   (b) a plastic netting having stationary portions fastened to said plastic film underlayment and mobile portions capable of substantial variation in spacing from the plastic film underlayment due to movement of the netting relative to the underlayment between said stationary portions, said plastic netting having a plurality of closely spaced fenestrations of a size adapted to engage and anchor 0.5 inch crushed stone, thereby providing a means to engage and hold stone-like aggregates contained in the cementitious mix to form an anchor to retard the flow of the cementitious mix down a sloping surface.
3. An underlayment as claimed in claim 2 in which the plastic film underlayment and plastic netting are fabricated from polyethylene.

References Cited

UNITED STATES PATENTS

| 2,139,749 | 12/1938 | Herbert | 52—661 |
| 2,816,323 | 12/1957 | Munger | 52—598 X |
| 3,058,863 | 10/1962 | Gaines et al. | 161—95 |

FOREIGN PATENTS 550,149   12/1942   Great Britain.

OTHER REFERENCES

Construction Methods, TAi, C 759, March, 1955, p. 87.

FRANK L. ABBOTT, *Primary Examiner.*

HENRY C. SUTHERLAND, *Examiner.*

A. C. PERHAM, *Assistant Examiner.*